United States Patent
Kocoloski et al.

(10) Patent No.: US 10,613,957 B2
(45) Date of Patent: Apr. 7, 2020

(54) ACHIEVING BALANCED EXECUTION THROUGH RUNTIME DETECTION OF PERFORMANCE VARIATION

(71) Applicant: Advanced Micro Devices, Inc., Sunnyvale, CA (US)

(72) Inventors: Brian J. Kocoloski, Pittsburgh, PA (US); Leonardo Piga, Austin, TX (US); Wei Huang, Frisco, TX (US); Indrani Paul, Round Rock, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 162 days.

(21) Appl. No.: 15/192,764

(22) Filed: Jun. 24, 2016

(65) Prior Publication Data
US 2017/0373955 A1 Dec. 28, 2017

(51) Int. Cl.
*G06F 11/30* (2006.01)

(52) U.S. Cl.
CPC .................. *G06F 11/30* (2013.01)

(58) Field of Classification Search
CPC .................................................. H04L 43/065
See application file for complete search history.

(56) References Cited

U.S. PATENT DOCUMENTS

| | | | |
|---|---|---|---|
| 2014/0108828 A1* | 4/2014 | Breternitz | G06F 1/329 713/300 |
| 2014/0372782 A1* | 12/2014 | Breternitz | G06F 1/3206 713/340 |
| 2015/0121396 A1* | 4/2015 | Martinez Canedo | G06F 8/4452 718/105 |

OTHER PUBLICATIONS

Petrovic, Milena (SQLShack, https://www.sqlshack.com/sql-server-processor-performance-metrics-part-2-processor-user-time-processor-privilege-time-total-times-thread-metrics/, Mar. 11, 2014) (Year: 2014).*

(Continued)

*Primary Examiner* — Nicholas P Celani
(74) *Attorney, Agent, or Firm* — Meyerstons Hood Kivlin Kowert and Goetzel PC; Rory D. Rankin

(57) ABSTRACT

Systems, apparatuses, and methods for achieving balanced execution in a multi-node cluster through runtime detection of performance variation are described. During a training phase, performance counters and an amount of time spent waiting for synchronization is monitored for a plurality of tasks for each node of the multi-node cluster. These values are utilized to generate a model which correlates the values of the performance counters to the amount of time spent waiting for synchronization. Once the model is built, the values of the performance counters are monitored for a period of time at the start of each task, and these values are input into the model. The model generates a prediction of whether a given node is on the critical path. If the given node is predicted to be on the critical path, the power allocation of the given node is increased.

20 Claims, 13 Drawing Sheets

(56) References Cited

OTHER PUBLICATIONS

Etinski et al., "Optimizing Job Performance Under a Given Power Constraint in HPC Centers", Proceedings of the International Conference on Green Computing, Aug. 2010, pp. 257-267, IEEE Computer Society, Washington D.C., USA.

Rountree, et al., "Adagio: Making DVS Practical for Complex HPC Applications", Proceedings of the 23rd International Conference on Supercomputing, Jun. 8-12, 2009, pp. 460-469, ACM, New York, NY, USA.

Marathe, et al, "A Run-Time System for Power-Constrained HPC Applications", High Performance Computing, Jun. 2015, pp. 394-408.

\* cited by examiner

```
Task 1:
  Node A:
    Parameter A: Value
    Parameter B: Value
       ⋮
    Parameter N: Value
    Time Waiting for Synchronization: Value
  Node B:
    Parameter A: Value
    Parameter B: Value
       ⋮
    Parameter N: Value
    Time Waiting for Synchronization: Value
       ⋮
  Node M:
    Parameter A: Value
    Parameter B: Value
       ⋮
    Parameter N: Value
    Time Waiting for Synchronization: Value Task 2:
   ⋮
```

ACHIEVING BALANCED EXECUTION THROUGH RUNTIME DETECTION OF PERFORMANCE VARIATION

The invention described herein was made with government support under contract number DE-AC02-05CH11231 awarded by the United States Department of Energy. The United States Government has certain rights in the invention.

BACKGROUND

Technical Field

Embodiments described herein relate to processing devices and more particularly, to achieving balanced execution in a multi-node cluster using run-time detection of performance variation.

Description of the Related Art

Parallel computing is the simultaneous execution of the same application or workload using multiple processing elements (e.g., nodes in a multi-node cluster) in order to obtain results faster. A parallel workload can be split up to be executed a piece at a time on many different nodes, and then put back together again at the end to get a data processing result. Often applications with multiple tasks executing concurrently may complete at different times, leading to significant levels of performance variation across a large scale system, with the nodes that finished early wasting power while waiting for other nodes to finish their tasks. Accordingly, the overall progress of the application is limited by the slowest tasks of the system. Performance variation can be caused by process differences among multiple processors, operating system noise, resource contention, and/or other factors. High performance computing applications are often tightly synchronized and massively parallel, and thus performance variation on even a small subset of the system can lead to large amounts of wasted power and lost performance.

SUMMARY

Systems, apparatuses, and methods for achieving balanced execution through runtime detection of performance variation are contemplated.

A multi-node cluster is configured to perform various types of parallel processing applications where a workload is split up into a plurality of tasks to be performed simultaneously on the plurality of nodes. The cluster attempts to reduce power consumption while performing applications by achieving balanced execution of tasks among the plurality of nodes. Nodes that are likely to finish their tasks relatively early can have their power allocation reduced while nodes that are likely to finish their tasks relatively late can have their power allocation increased.

In one embodiment, the cluster performs a training phase to determine a correlation between various performance parameters and an amount of time spent waiting for synchronization. In various embodiments, the performance parameters include branch and execution status, branch target address, data cache access status, data cache hit/miss ratio, data cache miss latency, translation lookaside buffer (TLB) hit/miss ratio, TLB page size, number of clocks from when a micro-op was tagged until it retires, number of clocks from when a micro-op completes execution until it retires, time spent in kernel mode versus user mode, and/or other parameters. Each node of the plurality of nodes of the cluster includes a plurality of performance counters for tracking performance parameters of the node while performing a task. During the training phase, each node tracks the values of the performance counters for a plurality of tasks performed by the node. Each node also monitors the amount of time spent waiting for synchronization for each task of the plurality of tasks. The values of the performance counters and the amount of time spent waiting for synchronization are then utilized to build a model for classifying nodes. Depending on the embodiment, the model is created using any of various techniques, including linear regression, machine learning, artificial intelligence, and/or other techniques. The model correlates the plurality of the performance parameter values with the amount of time spent waiting for synchronization. The model also identifies a subset of the performance parameters which have been predicted to most closely correlate to the amount of time spent waiting for synchronization.

After the model is created, the model is used during run-time for generating a prediction of whether a node is likely to be on the critical path. At the start of each task, a given node monitors the subset of performance parameters for an initial period of time. Then, the values of these performance parameters are input into the model, and the model generates a prediction based on these values. If the prediction indicates that the given node is likely to be on the critical path, then the given node increases power consumption so as to increase performance. This will allow the given node to complete its task more quickly. If the prediction indicates the given node is not likely to be on the critical path, then the given node decreases its power consumption. If the prediction is inconclusive, then the given node maintains its existing power allocation.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
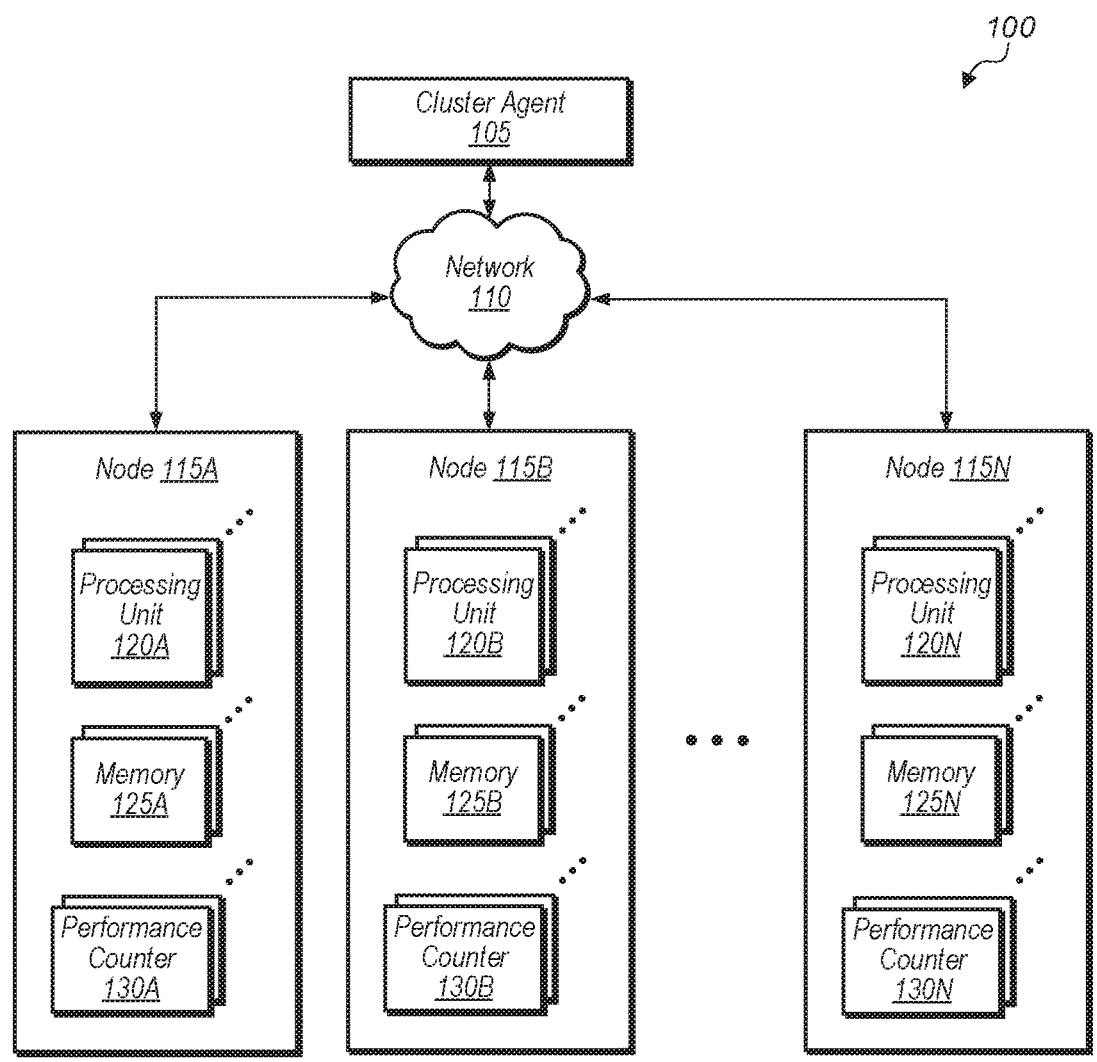
FIG. 1 is a block diagram of one embodiment of a computing system.

Referring now to FIG. 1, a block diagram illustrating one embodiment of a computing system 100 is shown. As shown in FIG. 1, system 100 includes cluster agent 105, network 110, and nodes 115A-N, which are representative of any number and type of compute nodes. In various embodiments, system 100 is used to process and store data, perform computational tasks, and transmit data to other devices and systems using network 110 or another network. In one embodiment, system 100 performs data processing on large datasets. For example, system 100 is configured to execute any of various types of workloads (e.g., parallel processing applications, MapReduce operations, simulations, modeling applications) depending on the embodiment.

Node 115A includes one or more processing units 120A, one or more memories 125A, and one or more performance counters 130A. Similarly, nodes 115B and 115N include one or more processing units 120B and 120N, one or more memories 125B and 125N, and one or more performance counters 130B and 130N, respectively. Performance counters 130A-N are representative of any number and type of performance counters for tracking various parameters, including branch and execution status, branch target address, data cache access status, data cache hit/miss ratio, data cache miss latency, translation lookaside buffer (TLB) hit/miss ratio, TLB page size, number of clocks from when the micro-op was tagged until it retires, number of clocks from when the micro-op completes execution until it retires, kernel mode flag, and/or other parameters. The kernel mode flag specifies the amount of time the processing unit(s) spend in kernel mode versus user mode.

Generally speaking, a node 115A-N is defined as an apparatus or system with at least one computing/processing element (e.g., processor, processor core, programmable logic device, application specific integrated circuit) and at least one memory device. The at least one computing element of the node is configured to execute instructions and/or perform one or more types of computations (e.g., floating point, integer, memory, I/O) depending on the embodiment. The components of each node 115A-N are interconnected by one or more communication buses. Processing units 120A-N are representative of any number and any type of processing element (e.g., CPU, GPU, processor core, accelerated processing unit (APU)). Processing units 120A-N have any number and type of caches (e.g., L1 cache, L2 cache). Processing units 120A-N are configured to execute instructions concurrently or in parallel.

Various types of memories 125A-N are utilized in nodes 115A-N, including random-access memory (RAM), static RAM (SRAM), dynamic RAM (DRAM), high-speed CMOS, high-density DRAM, eDRAM, 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc.

In various embodiments, network 110 includes any number and type of networks (e.g., local area network (LAN), wide area network (WAN), wireless networks, an Intranet, the Internet, storage area network (SAN)). Examples of LANs include Ethernet networks, Fiber Distributed Data Interface (FDDI) networks, and token ring networks. Network 110 also represents any type of wired or wireless connection medium. For example, wired mediums includes Ethernet, fiber channel, etc. Wireless connection mediums includes a wireless connection using a wireless communication protocol such as IEEE 802.11, a modem link through a cellular service, a satellite link, etc.

In one embodiment, cluster agent 105 utilizes a single program multiple data (SPMD) paradigm to map tasks to different nodes 115A-N. Each task in a parallel application is characterized as having three distinct phases of execution: computation, synchronization wait time due to performance variation, and synchronization. System 100 attempts to minimize the synchronization wait time across the cluster by adjusting power allocated to nodes based on whether the nodes are likely to be on the critical path or likely to be on the non-critical path. Generally speaking, the critical path refers to the longest-duration path required to complete a particular workload or work item. For example, completion of a given work requires execution and completion of several tasks. Out of these several tasks, those tasks that lie on the critical path cannot be delayed without delaying completion of the goal.

One of the many challenges in scaling parallel applications is managing performance variation across the many nodes 115A-N of system 100. Performance variation is problematic for high-performance computing (HPC) applications that are tightly synchronized, in which the overall progress of the application is limited by the slowest tasks/processes in the system. Unbalanced workload distribution, resource contention, operating system jitter/noise, and process variation in the underlying microarchitecture are each likely to contribute to variation in these system 100.

System 100 addresses the above-described problems by detecting variations as an application is running by using hardware performance counters 130A-N and classifying tasks as critical (e.g., less efficient tasks or tasks with more "work" to do) or non-critical (e.g., more efficient tasks or tasks with less "work" to do) based on performance measured in these counters. This approach leads to reduced power consumption by reducing resource usage (e.g., CPU frequency, memory frequency, number of cores being used, bus frequency, etc.) by non-critical tasks, and can furthermore improve performance by increasing resources available for use by critical tasks. In both cases, this approach allows applications to achieve more balanced execution.

Figure 2:
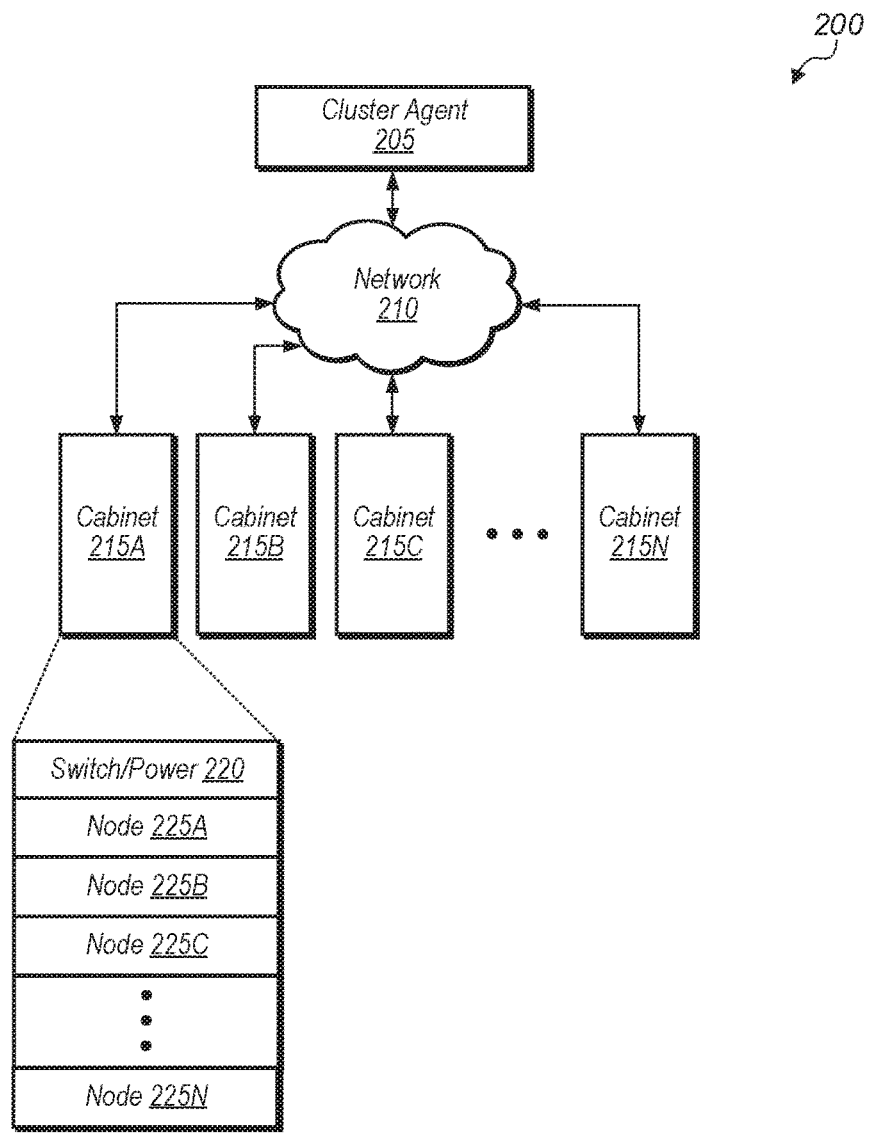
FIG. 2 is a block diagram of another embodiment of a computing system.

Turning now to FIG. 2, a block diagram illustrating another embodiment of a computing system 200 is shown. As shown in FIG. 2, system 200 includes cluster agent 205, network 210, and cabinets 215A-N. Each cabinet of cabinets 215A-N includes a plurality of nodes. In various embodiments, system 200 is used to process and store data, perform computational tasks, and transmit data to other devices and systems using network 210 or another network. In one embodiment, system 200 performs data processing on large datasets. For example, system 200 is configured to execute any of various types of workloads (e.g., parallel processing applications, MapReduce operations, simulations, modeling applications) depending on the embodiment. System 200 is also configured to work in various types of power constrained environments where the total amount of power allowed to be consumed by system 200 is capped. It is noted that system 200 may also be referred to as a supercomputer, data center, cluster, high performance computing (HPC) cluster, or cloud computing cluster.

As shown in FIG. 2, cabinet 215A includes switch/power unit 220 and nodes 225A-N, which are representative of any number and type of nodes. In one embodiment, cluster agent 205 is configured to manage the assignment of tasks to nodes and/or perform other management functions. In one embodiment, cluster agent 205 is implemented on one or more of the nodes of cabinets 215A-N. In another embodiment, cluster agent 205 is implemented separately from cabinets 215A-N in system 200. The nodes within each cabinet 215A-N are interconnected to one another through a switch (e.g., switch/power unit 220) and the cabinets 215A-N within system 200 may also be interconnected through a switch (not shown). The switch/power unit 220 is also configured to provide power to the nodes of cabinet 215A. Alternatively, in another embodiment, there are separate switch and power units, with power being provided to nodes 225A-N via a backplane or other mechanism. In some embodiments, there are multiple switches and/or power units per cabinet.

In various embodiments, system 200 utilizes a power-aware runtime system framework to enable balanced execution of large-scale parallel applications (e.g., high-performance computing scientific applications, cloud computing applications, MapReduce). System 200 executes parallel applications where multiple tasks executing concurrently complete at different times (e.g., bulk synchronous parallel), leading to significant levels of performance variation across system 200. Performance variations are caused by process differences among multiple server processors, operating system (OS) noise, resource contention, and/or other factors. System 200 implements a framework which uses performance counter information to classify individual concurrent tasks (herein, also referred to as "processes") of the application as critical or non-critical based on their likelihood of lying in the critical path of the application. The framework reduces the processing power (e.g., frequency reduction) of non-critical tasks resulting in a balanced execution through reduced wait times due to synchronization. The framework also improves performance by boosting the processing power of critical tasks using similar frequency scaling techniques.

Figure 3:
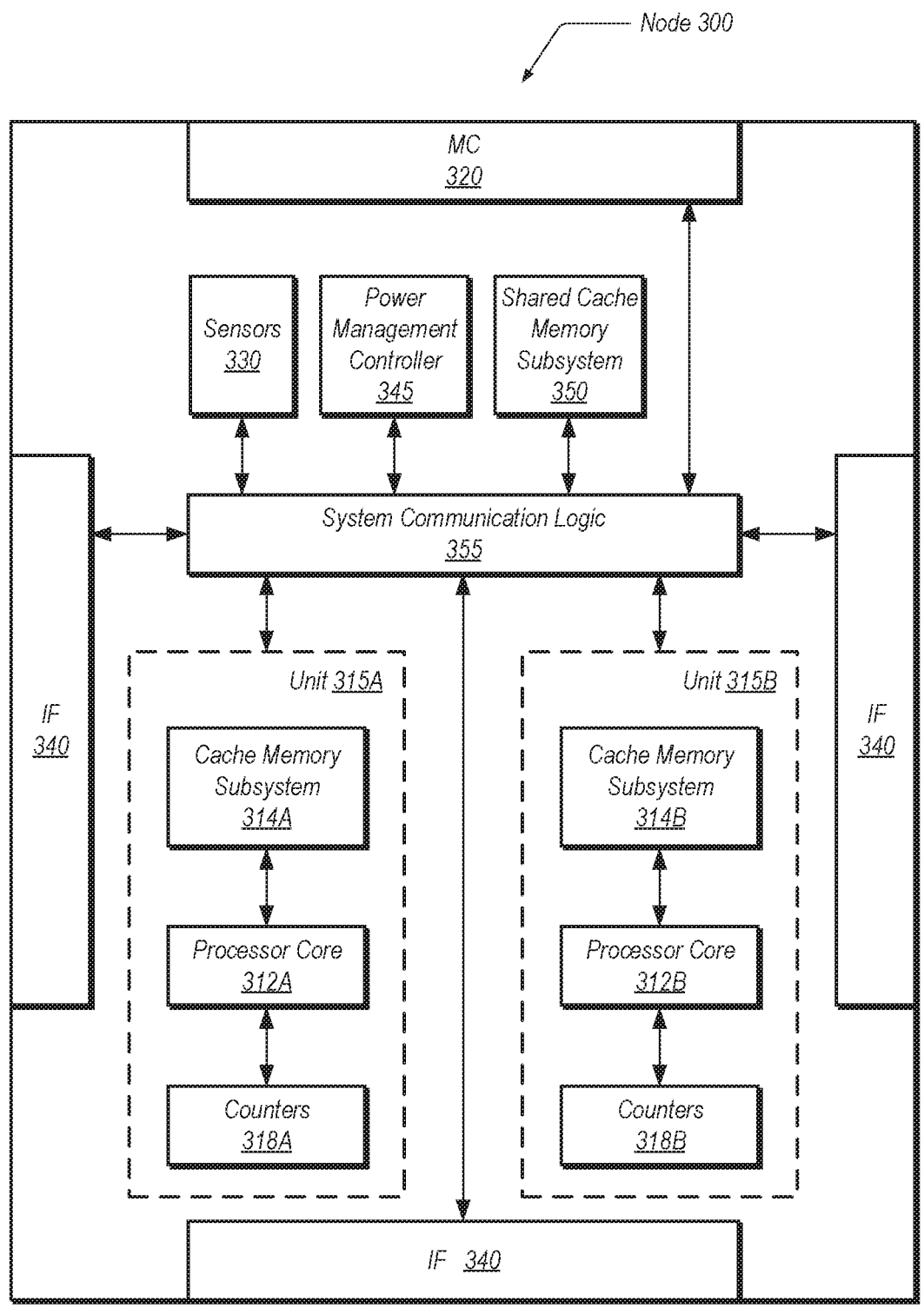
FIG. 3 is a block diagram of one embodiment of a node.

Referring now to FIG. 3, a block diagram of one embodiment of a node 300 is shown. The components of node 300 are included within each node of nodes 115A-N (of FIG. 1) or nodes 225A-N (of FIG. 2). Node 300 includes memory controller (MC) 320, interface logic 340, one or more processing units 315A-315B, which includes processor cores 312A-312B and corresponding cache memory subsystems 314A-314B, system communication logic 355, counters 318A-B, sensors 330, power management controller 345, and a shared cache memory subsystem 350. In one embodiment, the illustrated functionality of node 300 is incorporated into a single integrated circuit. In another embodiment, the illustrated functionality is incorporated in a chipset on a computer motherboard.

In one embodiment, node 300 is a stand-alone system within a mobile computer, a desktop, a server, or other device or system. In other embodiments, node 300 is one node within a socket of a multi-socket system. In some embodiments, the processing units 315A-315B and one or more other sources outside of node 300 access the shared cache memory subsystem 350. The other sources include general-purpose processors and graphical processing units (GPU's) on other nodes, input/output (I/O) devices, and so forth. In other embodiments, another level of cache, such as caches 314A-314B, in the cache memory hierarchy is shared by multiple sources.

Counters 318A-B include any number and type of counters, depending on the embodiment. For example, in one embodiment, counters 318A-B track various performance parameters including branch and execution status, branch target address, data cache access status, data cache hit/miss ratio, data cache miss latency, translation lookaside buffer (TLB) hit/miss ratio, TLB page size, number of clocks from when the micro-op was tagged until it retires, number of clocks from when the micro-op completes execution until it retires, and kernel mode flag. During a training phase, the data captured by counters 318A-B is used to build a model for classifying nodes. Then, once the model is built, the data captured by counters 318A-B for an initial period of time of a task is fed as inputs into the model to determine whether to reallocate power to node 300 (e.g., through dynamic voltage and frequency scaling (DVFS)) for the remainder of the task.

Processor cores 312A-312B include circuitry for executing instructions according to a predefined instruction set. Although two processor cores 312A-312B are shown in FIG. 3, node 300 includes another number of processor cores, such as a single processor core, four processor cores, and so forth. In one embodiment, the x86® instruction set architecture (ISA) is selected. Alternatively, the x86-64®, Alpha®, PowerPC®, MIPS®, SPARC®, PA-RISC®, or any other instruction set architecture is selected. Generally, processor cores 312A-312B access the cache memory subsystems 314A-314B, respectively, for data and instructions.

Cache memory subsystems 314A-314B and 350 comprise high-speed cache memories or arrays configured to store blocks of data. Cache memory subsystems 314A-314B are implemented as a hierarchy of caches. In one embodiment, cache memory subsystems 314A-314B each represent L2 cache structures, and shared cache memory subsystem 350 represents an L3 cache structure. An L1 cache structure is integrated within each of the processor cores 312A-312B. Other embodiments are possible and are contemplated.

Memory controller 320 is used to connect the node 300 to off-die memory. Memory controller 320 comprises control circuitry for interfacing to memories. Memory controller 320 follows memory channel protocols for determining values used for information transfer, such as a number of data transfers per clock cycle, signal voltage levels, signal timings, signal and clock phases and clock frequencies. Additionally, memory controller 320 includes request queues for queuing memory requests. The off-die memory includes one of multiple types of dynamic random access memories (DRAMs). The DRAM is further connected to lower levels of a memory hierarchy, such as a disk memory and offline archive memory.

The interface 340 includes integrated channel circuitry to directly link signals to other processing nodes, which include another processor. The interface 340 utilizes one or more coherence links for inter-node access of processor on-die caches and off-die memory of another processing node. Examples of the technology include HyperTransport and QuickPath. The interface 340 generally provides an interface for input/output (I/O) devices off the node 300 to the shared cache memory subsystem 350 and processing units 315A-315B. I/O devices include many variations of computer peripheral devices.

In one embodiment, system communication logic 355 is a system bus. In another embodiment, node 300 incorporates a Northbridge system bus controller in logic 355 in order to couple processing units 315A-315B to an off-chip memory, I/O devices, other off-chip processors such as a graphics processing unit (GPU), another type of single-instruction-multiple-data (SIMD) core, a digital signal processor (DSP), other general-purpose processors, and so forth. In such an embodiment, system communication logic 355 replaces or incorporates the functionality of memory controller 320 and interface logic 340.

In one embodiment, system communication logic 355 incorporates both a Northbridge and a Southbridge system bus controller. A Northbridge protocol is used to couple processing units 315A-315B to off-chip memory and a GPU. A Southbridge protocol is used to couple processing units 315A-315B to I/O devices, a real time clock, a power management unit, or other components. One example of such an embodiment of logic 355 includes the AMD-762™ Northbridge system controller and the AMD-768™ Southbridge peripheral bus controller.

In yet another embodiment, node 300 is one socket of a multi-socket system. System communication logic 355 incorporates packet-processing logic in such an embodiment. Generally speaking, system communication logic 355 is configured to respond to control packets received on the links to which the node 300 is coupled, to generate control packets in response to processor cores 312A-312B and/or cache memory subsystems 314A-314B, to generate probe commands and response packets in response to transactions selected by the memory controller 320 for service, and to route packets for which node 300 is an intermediate node to other nodes through interface logic 340. Interface logic 340 includes logic to receive packets and synchronize the packets to an internal clock used by packet processing logic within logic 355.

Figure 4:
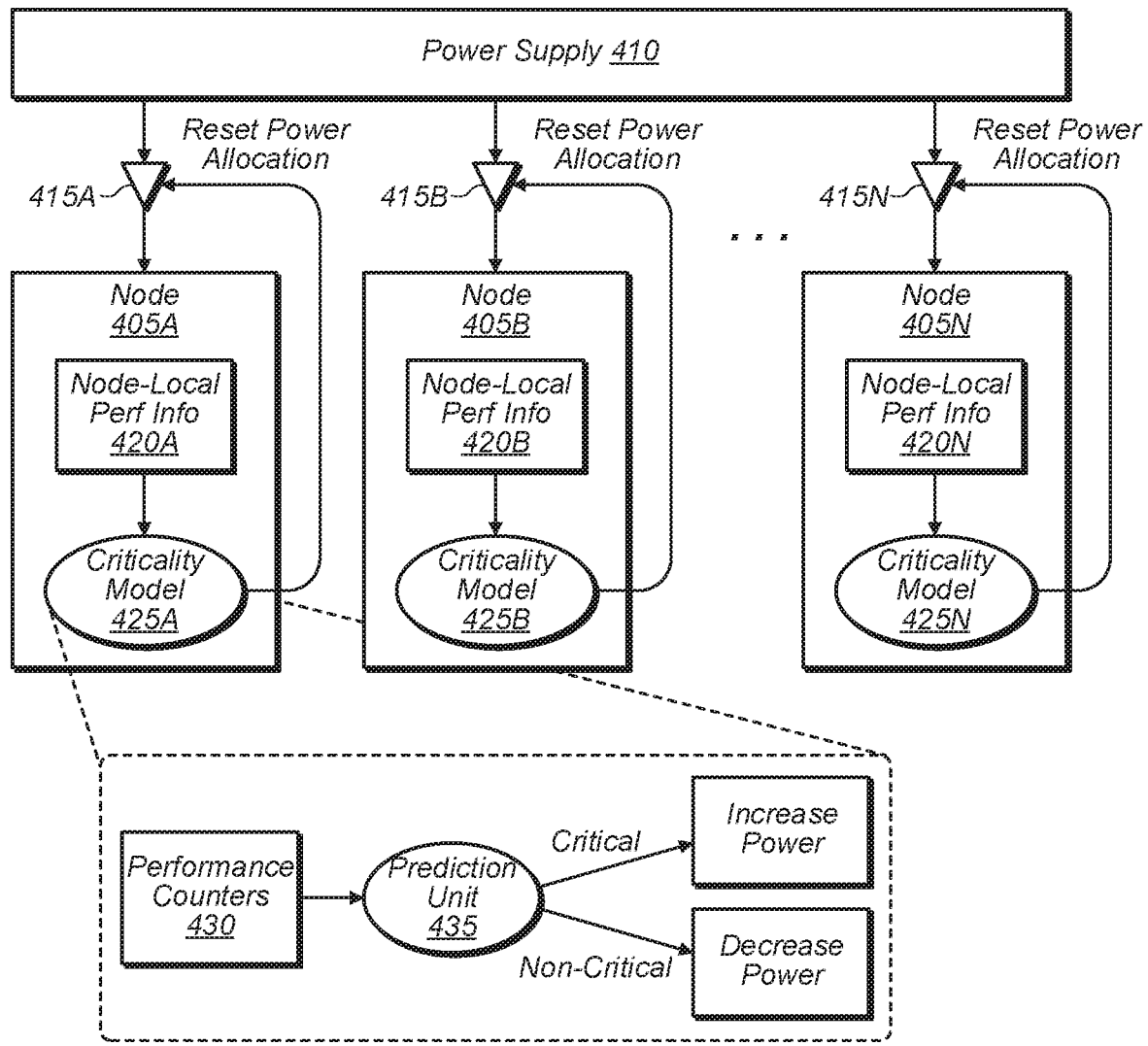
FIG. 4 is a block diagram of one embodiment of a computing system.

Turning now to FIG. 4, a block diagram of one embodiment of a computing system 400 is shown. System 400 includes a plurality of nodes 405A-N. In one embodiment, each node 405A-N is assigned to execute a particular task, with each task being assigned a unique rank, such that the task can be identified by its unique rank. Power is provided by power supply 410, and each node 405A-N may control its own power allocation via regulators 415A-N. Each node 405A-N includes node-local performance data 420A-N, respectively. The node-local performance data 420 includes various metrics collected from various performance counters. In one embodiment, each node 405A-N tracks the performance counters for a period of time at the beginning of the task, and node-local performance data 420A-N represents the values of these performance counters captured during the period of time at the beginning of the task.

For each node 405A-N, the node-local performance data 420A-N is fed as inputs into the criticality model 425A-N, respectively. The criticality model 425A for node 405A is expanded to show additional details of one embodiment of a criticality model. The values of performance counters 430 are fed into prediction unit 435. Prediction unit 435 utilizes a model for determining if a node is on a critical path based on the values of performance counters 430. In one embodiment, each node 405A-N runs the same model for generating a prediction, with the model being distributed to each of the nodes 405A-N prior to execution starting on the current workload. In another embodiment, each node 405A-N utilizes a model which is unique and different from the models utilized by the other nodes 405A-N.

In one embodiment, prediction unit 435 generates a prediction of whether node 405A is on the critical path or on the non-critical path. If node 405A is on the critical path, then node 405A increases power to increase performance and reduce the total computation time for its current task. On the other hand, if node 405A is on the non-critical path, then node 405A decreases power which will result in increased computation time for the node. However, this should not affect the overall workload computation time since node 405A is not expected to be on the critical path, since one or more other nodes will likely take longer to complete their tasks even if node 405A reduces its power consumption. In some cases, the prediction generated by rank prediction unit 435 is inconclusive. In the inconclusive case, node 405A remains at its current power setting, neither increasing nor decreasing power consumption. It is noted that while the description herein generally describes increasing or decreasing power for nodes on a critical or non-critical path, respectively, other embodiments will take different actions to improve performance of a given node. For example, allocating more or less of a limited resource (e.g., memory or other storage resources) will have the effect of increasing or decreasing performance. Changing a bus frequency will have the effect of increasing or decreasing performance of a node. Additionally, a combination of such approaches are used. These and other resource allocation decisions are possible and are contemplated.

Figure 5:
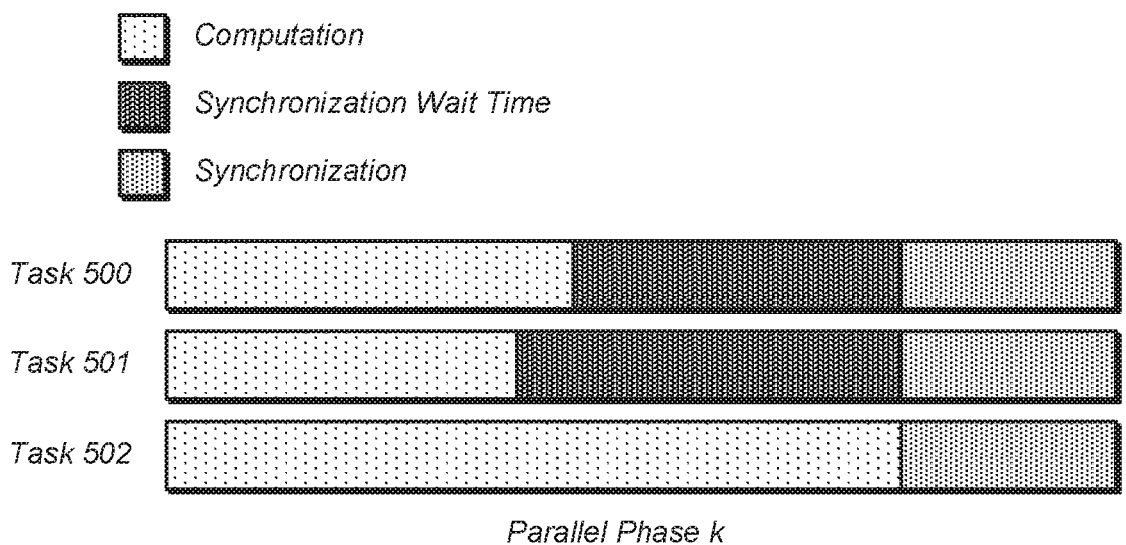
FIG. 5 illustrates a diagram of three tasks executing a parallel phase of an application.

Referring now to FIG. 5, a diagram of three tasks executing a parallel phase of an application is shown. Each task in a parallel application is characterized as having three distinct phases of execution: computation, synchronization wait time due to performance variation, and synchronization. Each task is mapped to and performed by a separate node of a multi-node cluster. As FIG. 5 demonstrates, each task spends different amounts of time performing computation leading to performance variation, and as a result, different amounts of time waiting for synchronization. For each synchronization point in an application, there is a single task that has the longest computational time—or, equivalently, the shortest synchronization wait time. The critical path of the application is referred to as a sequence 'P', where each $P_i$ is the task with the longest computational time preceding synchronization point i. Thus, the length of 'P' is equal to the number of synchronization points in the application. As FIG. 5 demonstrates, Task 502 is the $k^{th}$ task in 'P' for this simple example.

As shown in FIG. 5, task 501 is classified as a non-critical task since it spends the most amount of time in the synchronization wait time phase of execution. Task 502 is classified as a critical task since it spends the least amount of time in the synchronization wait time phase of execution. Depending on the embodiment, and depending on the value of a threshold utilized to distinguish between critical and non-critical tasks, task 500 is classified as a non-critical task or the model may classify the prediction as inconclusive for task 500.

Figure 6:
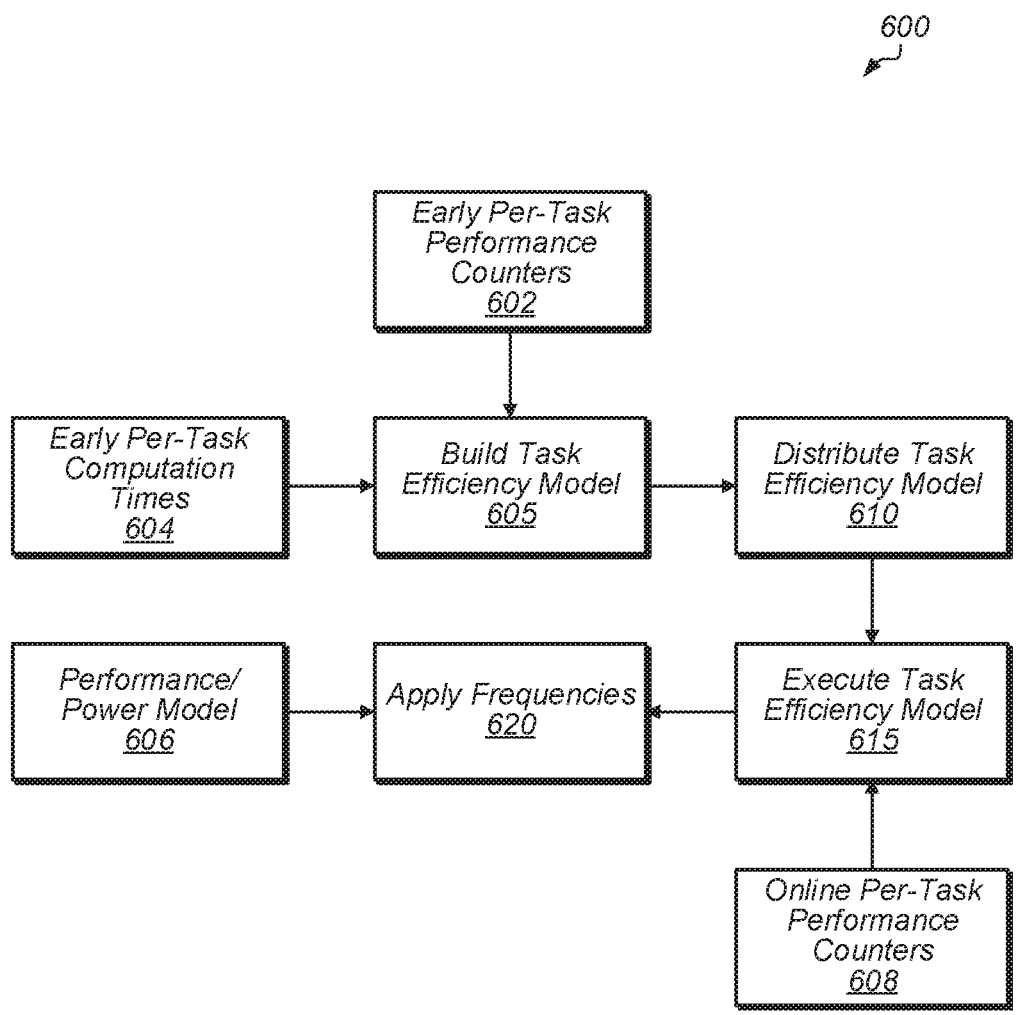
FIG. 6 is a block diagram of one embodiment of a run-time framework.

Turning now to FIG. 6, a block diagram of one embodiment of a run-time framework 600 is shown. Framework 600 includes a step 605 for building a task efficiency model (TEM) using the early per-task performance counters (602) and the early per-task computation times (604) from one or more parallel phases of an application as inputs. In some embodiments, the amount of time spent waiting for synchronization is utilized as an input for building the TEM rather than using the per-task computation time as an input. It is noted that for a given phase of the application, the sum of the amount of time spent waiting for synchronization and the computation time is equal for each node of the cluster for the same phase. In other words, if a given node has a relatively short computation time, then the given node will have a relatively long time waiting for synchronization. The TEM classifies the likelihood that a given task, based on its performance counters from a computational period, will constitute the critical path for the next synchronization point. The TEM also classifies processes into slow versus fast categories. In other embodiments, the TEM generates other types of predictions and/or perform other types of classifications. In another embodiment, the TEM is built offline from an entire application trace.

Next, in step 610, the TEM is distributed to each node executing a parallel task. Alternatively, in another embodiment, the TEM is generated separately on each node using the local per-task performance counters and per-task computation times. Then, in step 615, the TEM is executed by each node during the remaining parallel portions of the application. For example, during a given task, values of the performance counters (608) are collected for an initial portion of the given task. Then, using the values of these performance counters, each node executes the TEM in the given task to determine the likelihood that the given task lies on the critical path.

Based on the likelihoods generated in step 615, each node applies frequency scaling techniques in step 620 to slow down tasks deemed less likely to be on the critical path and to speed up tasks deemed more likely to be on the critical path. Each node utilizes an established performance/power model (PPM) (606) to determine how to apply frequency scaling techniques. In one embodiment, the PPM specifies how much of a voltage and/or frequency change to make to the node based on the prediction generated in step 615.

In one embodiment, the TEM is built in an online manner from the early parallel phases of an application. At runtime, the system chooses some initial fraction (e.g., the first 10%) of the total number of parallel phases to build the TEM. Alternatively, in another embodiment, the TEM is built in an offline manner based on an application trace.

Figure 7:
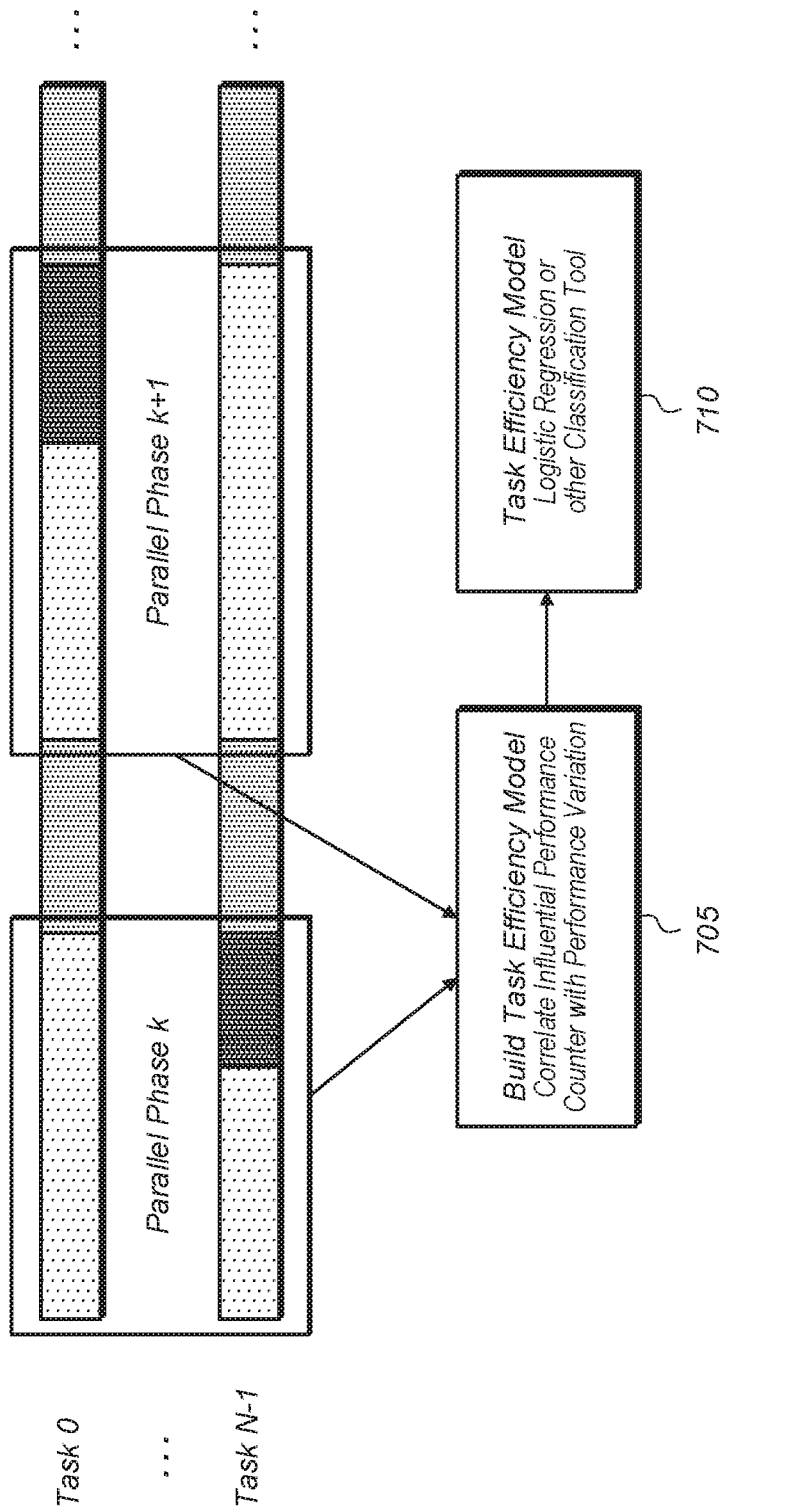
FIG. 7 illustrates a diagram of one embodiment of building a task efficiency model (TEM).

Referring now to FIG. 7, a diagram of one embodiment of building a task efficiency model (TEM) is shown. In this embodiment, the process of building the TEM in step 705 receives two sources of input from each task in the system. The first input source includes the values of the performance counters of the node executing the task. The second input source includes the amount of time spent waiting for synchronization. Depending on whether the model is built in an online or offline manner, these input sources are derived from a subset or all parallel phases in the application. In one embodiment, the mechanism for building the TEM includes one or more nodes of the multi-node cluster. In other embodiments, other systems utilizing any suitable combination of hardware and/or software are configured to build the TEM. To build the TEM, the mechanism determines which performance counters from the tasks explain the measured performance variation in the computational phases of the application. Such performance counters could include hit/miss rates in various caches and TLBs, the percentage of CPU time spent in kernel mode versus user mode, or other parameters. For example, the mechanism may determine that having an (level one) L1 TLB hit rate less than some threshold indicates the task is less efficient than other tasks and thus is more likely to be on the critical path. This mechanism uses machine learning techniques, such as information gained from using performance counters in decision trees or regression models, to learn influential performance counters and thresholds.

Given a set of performance counters from a task, the TEM classifies the likelihood that the task is on or near the critical path of a given parallel phase (i.e., will require more time to complete than the majority of other tasks in the system) in step 710. While logistic regression is used in one embodiment of an implementation of the TEM, other classification tools such as support vector machines are used in other embodiments. Once the TEM is built, the TEM is distributed to each node in the system. In one embodiment, distributing the TEM involves sending, to each node in the system, the chosen performance counter thresholds and a set of likelihood outcomes that the classifier may produce. Once the TEM is distributed to the nodes, each task executes the TEM in a distributed fashion, requiring no inter-node communication. This is beneficial for extreme scale systems, where frequent inter-node communication could limit the scalability of the runtime framework and add contention to the application's use of the interconnect.

Figure 8:
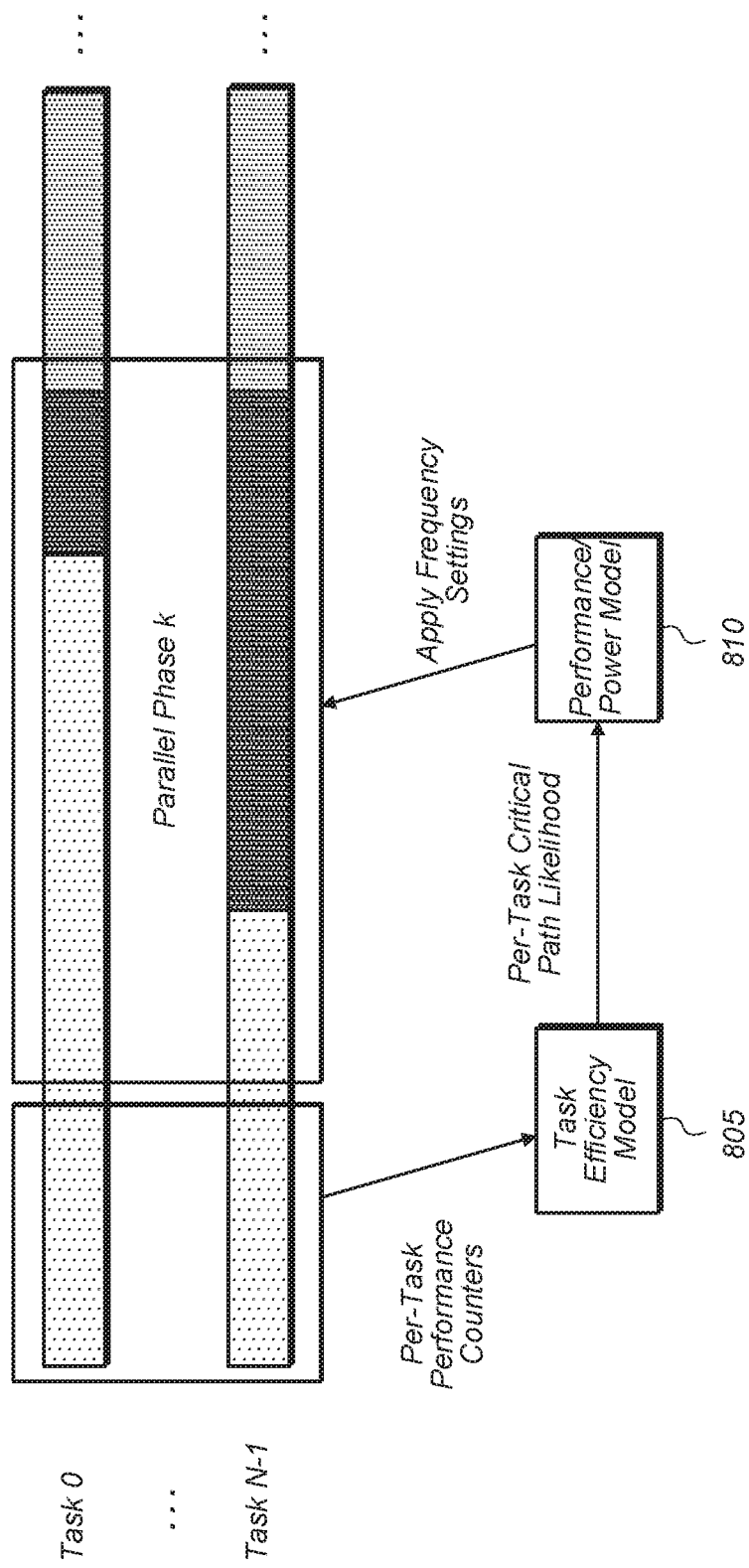
FIG. 8 illustrates a diagram of one embodiment of executing a TEM and applying frequency settings.

Turning now to FIG. 8, a diagram of one embodiment of executing a TEM and applying frequency settings is shown. In this embodiment, the TEM is built by a central agent (e.g., cluster agent 105 of FIG. 1) and distributed to the other nodes. In another embodiment, each node builds its own TEM. After the TEM is built, each node running an application task executes the TEM during each remaining parallel phase. If the TEM is built offline, the TEM is executed during all parallel phases of the application. As FIG. 8 demonstrates, during the "early" portion of a parallel phase's computation, each task collects the performance counters that are specified by the TEM 805 to correlate to performance variation. The "early" portion of the parallel phase's computation includes a programmable duration of the phase, with the duration of the "early" portion varying from embodiment to embodiment, and with the "early" portion being less than the total amount of time utilized by the node for performing the task. It is noted that the TEM may also be referred to as a "performance variability predictor".

TEM 805 utilizes the values of the performance counters during the "early" portion of computation to determine the likelihood that a given task will be on the critical path at the next synchronization point. This likelihood (i.e., prediction) is provided to the power/performance model (PPM) 810. PPM 810 then generates frequency and/or voltage settings based on the likelihood and then these frequency and/or voltage settings are applied to one or more components of the node.

Given a likelihood estimate from the TEM 805, a task determines whether or not it needs to execute the rest of the computational period more or less quickly than the task's current computation rate. If the TEM 805 estimates that a task is likely to lie on the critical path (i.e., the task is being performed at relatively low efficiency), that task decides to boost its processor frequency and/or other power settings in order to finish its computation more quickly. Alternatively, if the TEM 805 estimates that a task is unlikely to lie on the critical path (i.e., the task is being performed at relatively high efficiency), that task decides to decrease its frequency and/or other power settings in order to save power. Such a decision to reduce the power consumption of a highly efficient task is unlikely to delay the overall performance of the parallel application as it is likely that another inefficient task will be on the critical path.

In one embodiment, frequencies and/or other power settings are selected by PPM 810. A task determines that it wants to reduce or increase its performance by a certain percentage. By querying the PPM 810 with this percentage, the PPM can allocate a new amount of power for the task. The task can then select an effective frequency such that the node will abide by this power constraint.

Although the above techniques are described as being implemented as part of a balanced execution approach, the performance variability predictor can also be used in any other datacenter level power management framework such as race to idle. In another embodiment, the accuracy of the performance variability predictor is improved by the application providing software hints on an amount of work distribution imbalance.

Figure 9:
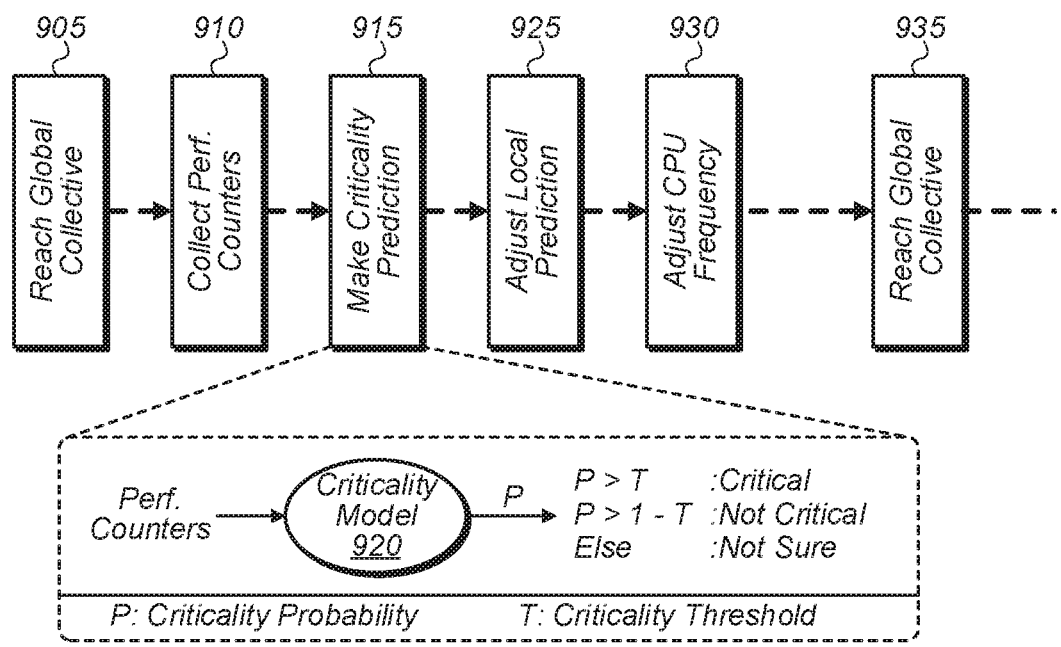
FIG. 9 illustrates a diagram of one embodiment of the execution of a run-time environment for achieving balanced execution in a multi-node cluster.

Referring now to FIG. 9, a diagram of the execution of a run-time environment for achieving balanced execution in a multi-node cluster is shown. The run-time environment operates at the granularity of global collectives (i.e., synchronization points at the end of application phases). Once a node reaches a global collective in block 905, then at the start of the new phase, the node collects performance counters and/or other parameters for a short period of time as shown in block 910. Then, the values of the performance counters are utilized as inputs to a criticality model for making a prediction of the node's efficiency in performing its current task as shown in block 915.

Block 915 is expanded to show the steps in making the criticality prediction. The performance counters are input into the criticality model 920, and then criticality model 920 generates a criticality probability (i.e., prediction) 'P'. If the criticality probability 'P' is greater than the criticality threshold 'T', then the node is characterized as on the critical path (i.e., a member of the critical set of nodes). If the criticality probability 'P' is less than (1-'T'), then the node is characterized as not on the critical path (i.e., a member of the non-critical set of nodes). Otherwise, if the criticality probability 'P' is not greater than the criticality threshold 'T' and if the criticality probability 'P' is not less than (1-'T'), then the prediction is classified as inconclusive.

The output of the criticality model 920 is coupled to the adjust local power allocation block 925. If the node is classified as being on the critical path, then the power allocation is increased for the node. If the node is classified as not being on the critical path, then the power allocation is decreased for the node. Otherwise, if the prediction was inconclusive, then the node keeps the power allocation unchanged. To adjust power allocation, the node uses dynamic voltage and frequency scaling (DVFS) to change the CPU frequency to a frequency that limits the node's power consumption to the chosen power allocation as represented by adjust CPU frequency block 930. After selecting a new power allocation, each node runs until reaching the next collective point (shown in block 935), at which point the run-time system resets power allocations and re-executes the performance counting phase.

The criticality prediction model 920 is utilized to generate the predictions which will cause power allocations to be adjusted on a node-by-node basis, with each node determining its own power allocation independently from the other nodes. Given a set of performance measurements from a node, model 920 predicts the likelihood that the node will belong to the critical set of nodes at a given point in time. These predictions are made at the beginning of each computational phase to predict the node's behavior until the next collective operation or until the time when the next prediction is made. Model 920 is first trained on a per-application basis with performance measurements from nodes deemed to be "critical" (i.e., in the critical set) or "not critical" (i.e., not in the critical set). In other words, those nodes deemed to be "critical" are nodes that are inefficient and will take the longest amount of time to perform their tasks for the current phase. Those nodes deemed to be "not critical" are nodes that are efficient and will take the shortest amount of time to perform their tasks for the current phase. Model 920 is trained by either parsing an existing application trace in an offline manner, or by collecting performance measurements online during a configurable number of early iterations of an application. In one embodiment, model 920 is generated from the performance data using logistic regression. In other embodiments, model 920 is generated using support vector machines or other classification tools.

Each rank of an application provides performance measurements during the training phase used to generate model 920. The performance measurements include hardware performance counters and message passing interface (MPI) timing information (e.g., slack). Whenever a rank reaches a collective point, the rank gathers performance measurements for a configurable amount of time. Once the rank reaches the next collective point, the rank records the amount of time until the collective completes, with the rank using this amount of time as a proxy for the slack for that phase of the application.

Figure 10:
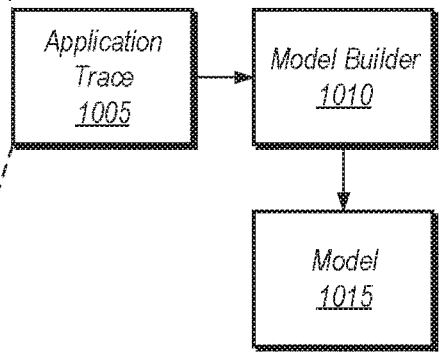
FIG. 10 is a block diagram of one embodiment of building a model for classifying nodes.

Turning now to FIG. 10, a block diagram of one embodiment of building a model for classifying nodes is shown. In this embodiment, a plurality of nodes of a cluster collect performance data while performing a plurality of tasks of an application. This data is stored in an application trace as shown in application trace 1005. Any number 'N' of performance parameters are tracked for each node of the cluster. Additionally, any number 'M' of nodes are included within the cluster.

The performance data in application trace 1005 is fed as an input to model builder 1010. In another embodiment, this data is collected from nodes in real-time rather than from an application trace. Model builder 1010 executes on any type of computing system, with the computing system including at least one or more processors and one or more memory devices. Model builder 1010 is configured to correlate the performance values from counters A-N of each of the nodes A-M to the amount of time waiting for synchronization for each node A-M. Depending on the embodiment, model builder 1010 uses any of various techniques for building model 1015, including logistic regression, support vector machines, machine learning, artificial intelligence, neural networks, or other techniques. Once model 1015 is built, model 1015 is utilized for generating predictions in real-time on whether a node is on the critical path. Each node tracks the performance parameters for an initial period of time at the beginning of each task and then the values of the performance parameters are fed into model 1015 to generate a prediction for the node. The predictions generated by model 1015 are utilized to adjust power allocated to each node on an individual basis.

Figure 11:
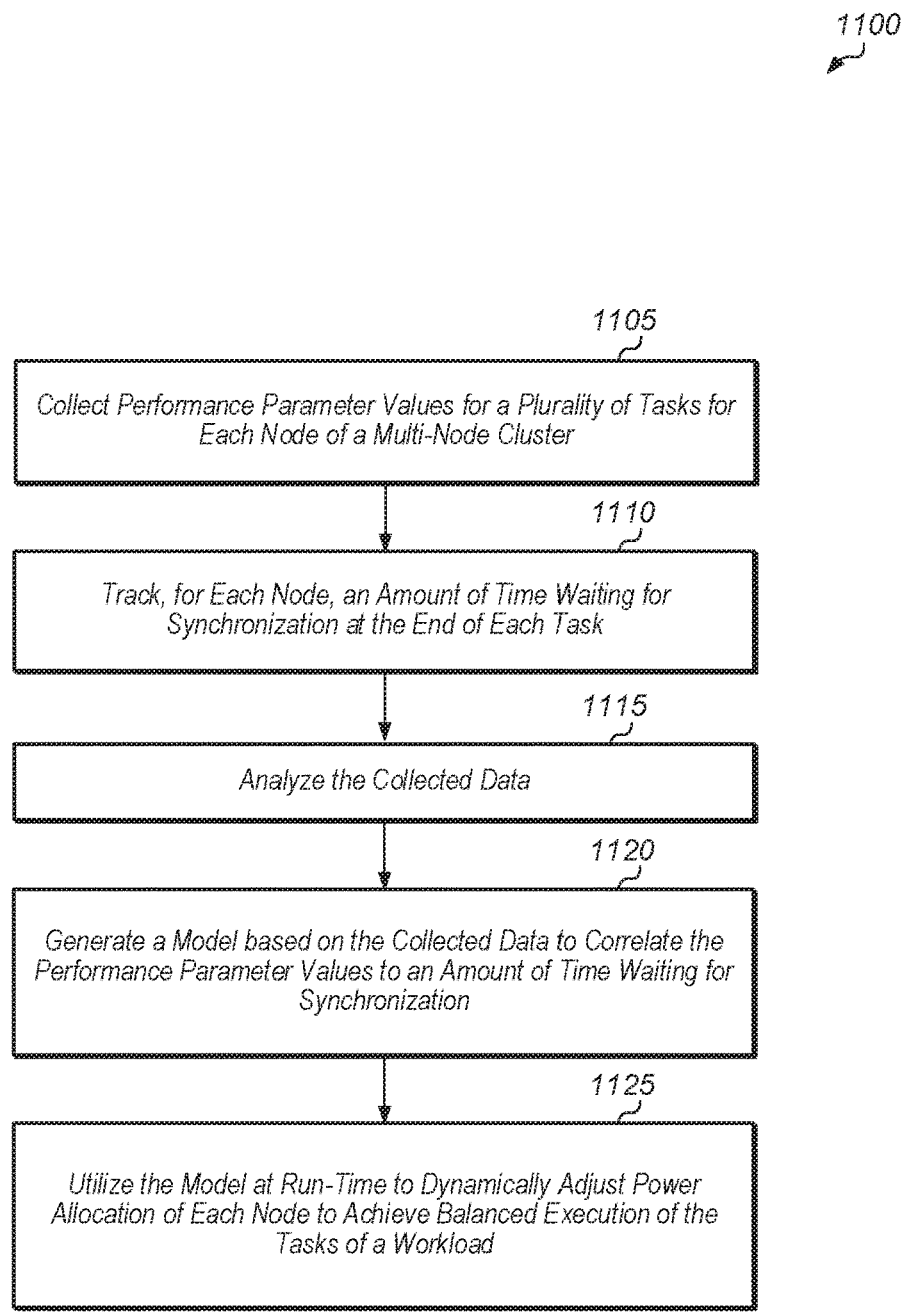
FIG. 11 is a generalized flow diagram illustrating one embodiment of a method for achieving balanced execution in a multi-node cluster.

Referring now to FIG. 11, one embodiment of a method 1100 for achieving balanced execution in a multi-node cluster is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1100.

Each node of a multi-node cluster collects performance parameter values for a plurality of tasks (block 1105). The performance parameter values include branch and execution status, branch target address, data cache access status, data cache hit/miss ratio, data cache miss latency, TLB hit/miss ratio, TLB page size, number of clocks from when the micro-op was tagged until it retires, number of clocks from when the micro-op completes execution until it retires, kernel mode flag, and/or other parameters. Also, each node tracks an amount of time waiting for synchronization at the end of each task (block 1110). For example, each task ends with a barrier, and each node waits at the barrier for all other nodes to reach the barrier before starting a new task. Next, the collected data is analyzed using any of various techniques (block 1115). For example, the techniques include logistic regression, machine learning, artificial intelligence, statistical analysis, or other techniques. Then, a model is generated based on the collected data to correlate the performance parameter values to an amount of time waiting for synchronization (block 1120). The model may also be referred to as a classifier. Then, the model is utilized at run-time to dynamically adjust power allocation of each node to achieve balanced execution of the tasks of a workload (block 1125). For example, if a model predicts that a first node is likely to be on the critical path, then the power allocated to the first node is increased. Also, if the model predicts that a second node is not likely to be on the critical path, then the power allocated to the second node is decreased. After block 1125, method 1100 ends. In various embodiments, the model makes such predictions for a given node independent of predictions made for other nodes. As such, predictions for a node are made without the need to communicate with other nodes.

Figure 12:
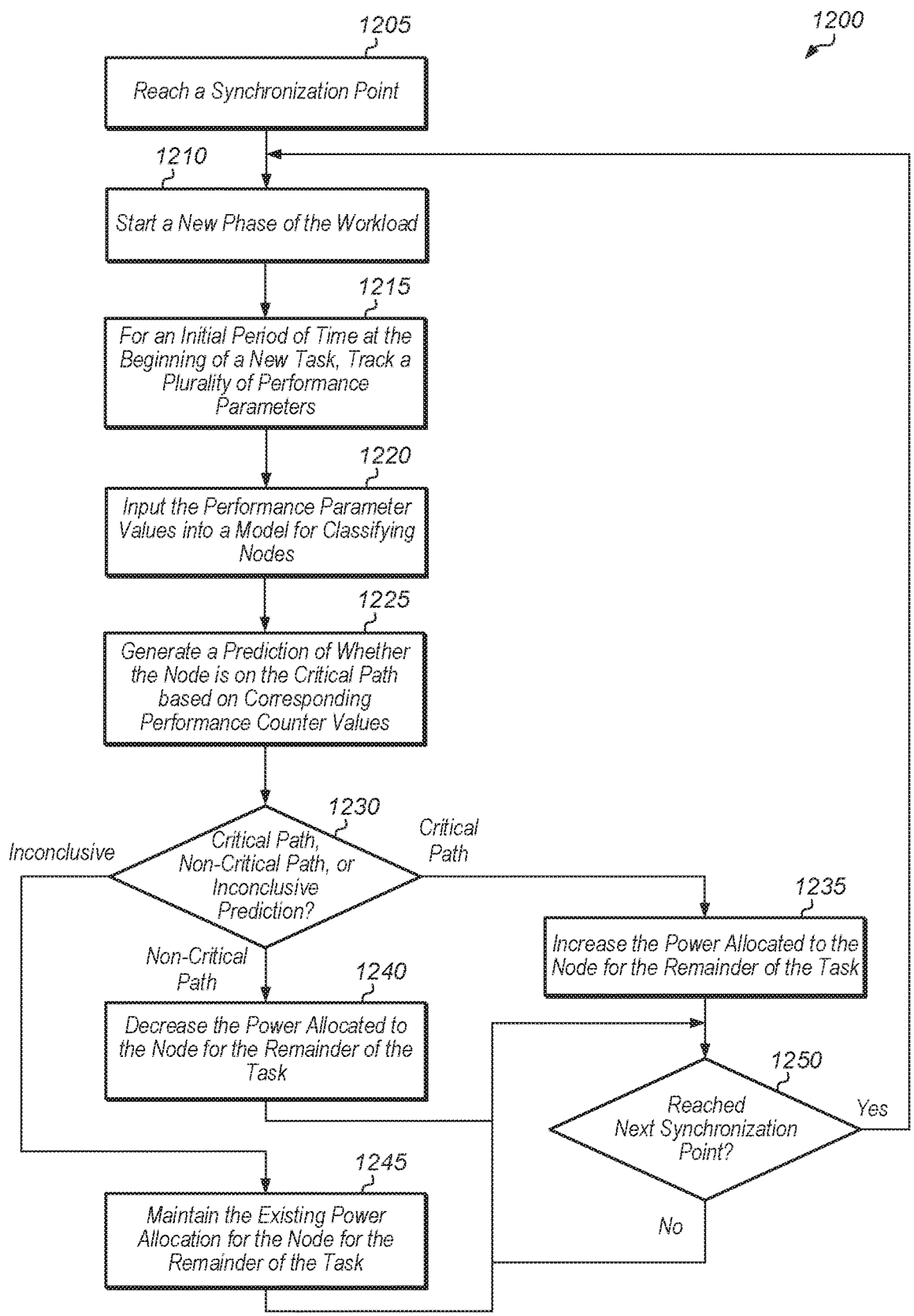
FIG. 12 is a generalized flow diagram illustrating another embodiment of a method for achieving balanced execution in a multi-node cluster.

Turning now to FIG. 12, another embodiment of a method 1200 for achieving balanced execution in a multi-node cluster is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1200.

During execution of a workload, a multi-node cluster reaches a synchronization point (block 1205). In one embodiment, the synchronization point is a barrier at the end of a given task of a workload. Next, the multi-node cluster starts a new phase of the workload (block 1210). Then, for an initial period of time at the beginning of a new task, each node tracks a plurality of performance parameters for the initial period of time (block 1215).

Next, for each node, the performance parameter values are input into a model for classifying nodes (block 1220). Next, for each node, the model generates a prediction of whether the node is on the critical path based on the corresponding performance counter values (block 1225). In one embodiment, generating a prediction of whether the node is on the critical path constitutes generating a prediction of whether the node will take longer than a programmable threshold amount of time to complete a current task. The model generates a prediction for a given node independently from predictions generated for the other nodes.

If the prediction indicates the node is on the critical path (conditional block 1230, "critical path" leg), then the power allocated to the node is increased for the remainder of the task (block 1235). If the prediction indicates the node is on the non-critical path (conditional block 1230, "non-critical path" leg), then the power allocated to the node is decreased for the remainder of the task (block 1240). If the prediction indicates the node is on the non-critical path (conditional block 1230, "inconclusive" leg), then the node maintains its existing power allocation for the remainder of the task (block 1245). After blocks 1235, 1240, and 1245, if the cluster has reached the next synchronization point (conditional block 1250, "yes" leg), then method returns to block 1210. If the cluster has not yet reached the next synchronization point (conditional block 1250, "no" leg), then method remains at conditional block 1250.

Figure 13:
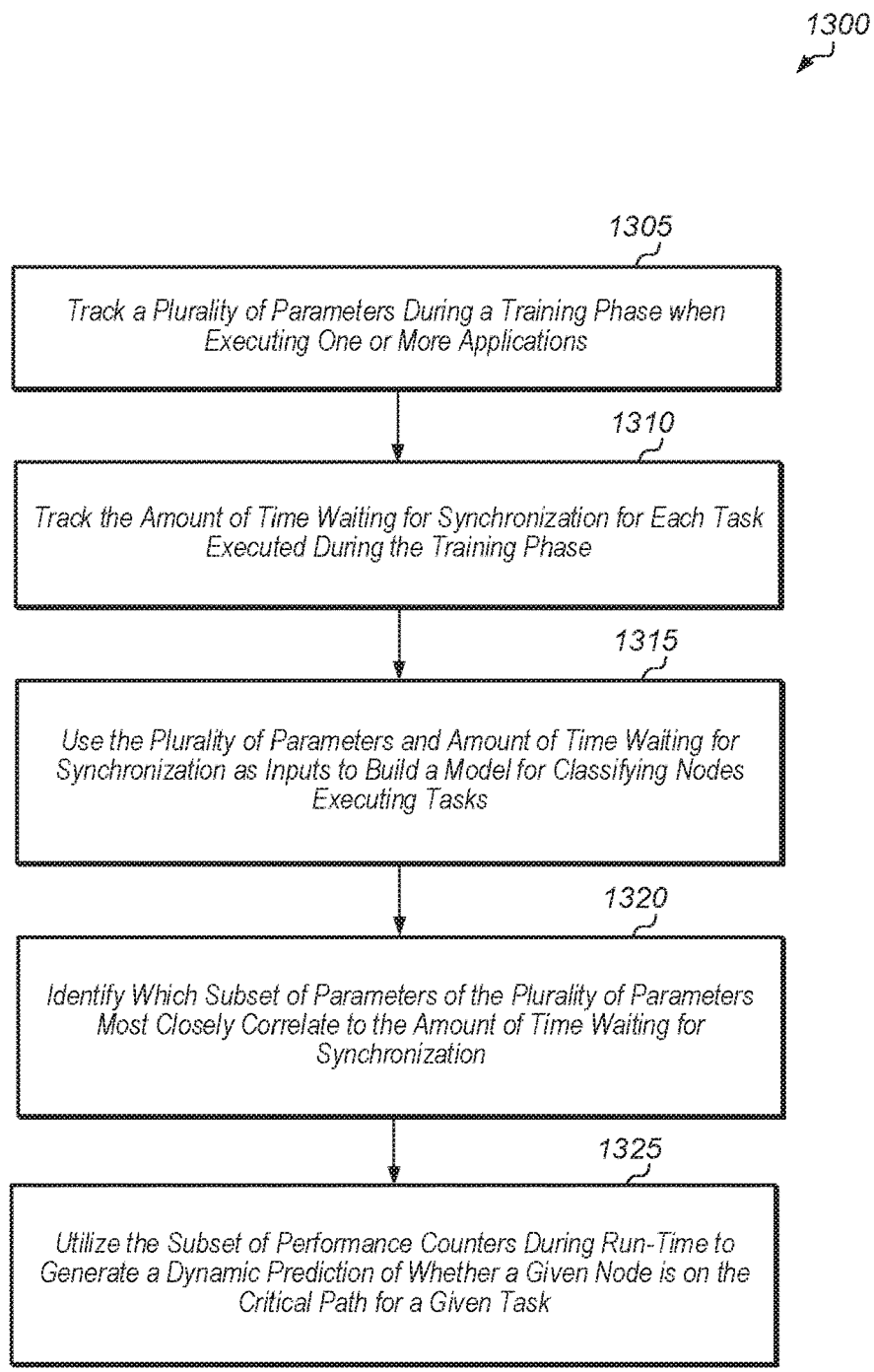
FIG. 13 is a generalized flow diagram illustrating one embodiment of a method for identifying a subset of performance counters for use in generating a prediction.

Referring now to FIG. 13, one embodiment of a method 1300 for identifying a subset of performance counters for use in generating a prediction is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1300.

A plurality of nodes track a plurality of parameters (e.g., performance counters) during a training phase when executing one or more applications (block 1305). Depending on the embodiment, the training phase is performed in real-time or in an offline manner using an application trace. Also, the plurality of nodes track the amount of time waiting for synchronization for each task executed during the training phase (block 1310). Then, the plurality of parameters and amount of time waiting for synchronization for each task are used as inputs to build a model for classifying nodes executing tasks (block 1315).

Then, the mechanism for building the model identifies which subset of parameters of the plurality of parameters correlate most closely correlate to the amount of time waiting for synchronization (block 1320). In other words, the model building mechanism determines which subset of parameters are able to provide the best prediction of which nodes are on the critical path for a given task. In one embodiment, the subset of parameters for providing the best prediction include one or more of the amount of time spent in kernel mode versus the amount of time spent in user mode, the TLB hit/miss ratio at one or more cache levels (e.g., level one (L1) TLB), the number of cycles from instruction completion to retirement, and/or the number of cycles from instruction tagging to retirement. In some cases, an average number of cycles from instruction completion to retirement and/or an average number of cycles from instruction tagging to retirement for a plurality of instructions are utilized. In other embodiments, other parameters are identified as the subset of parameters that provide the best or closest correlation to predicting the amount of time a node will wait for synchronization when executing a given task. Next, the model utilizes the subset of performance counters during run-time to generate a dynamic prediction of whether a given node is on the critical path for a given task (block 1325). After block 1325, method 1300 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a computing cluster comprising plurality of nodes; and
    a cluster agent configured to map each task of a plurality of tasks of a workload to a different node of the plurality of the nodes, each of the plurality of tasks ending with a barrier configured to wait for all nodes of the cluster executing a task of the plurality of tasks to reach the barrier before starting a new task;
    wherein each node of the plurality of nodes comprises circuitry configured to:
        create a run-time prediction model independently of models created by other nodes of the plurality of nodes while performing a given task, wherein the model provides a prediction of an amount of time to complete the given task based on an amount of time waiting for synchronization of the given task and run-time values of one or more of a plurality of performance parameters of a node; and
        identify, using the model, a subset of performance parameters of the plurality of performance parameters which are predicted to correlate to an amount of time waiting for synchronization of the given task;
    wherein while the cluster has not reached a synchronization point, each node of the plurality of nodes comprises circuitry configured to:
        track the subset of performance parameters during an initial period of time while performing a current task of the workload;
        generate, independently of other nodes, a prediction while performing the current task, of how long the node will take to complete the current task, wherein the prediction is generated by the model using the subset of performance parameters;
        increase an amount of power allocated to the node subsequent to the initial period of time responsive to predicting, during performance of the current task, that the node will take longer than a programmable threshold amount of time to complete the current task;
        decrease, during run-time, the amount of power allocated to the node subsequent to the initial period of time responsive to predicting, during performance of the current task, that the node will take less than the programmable threshold amount of time to complete the current task; and
        determine if the cluster has reached the synchronization point.

2. The system as recited in claim 1, wherein each node is further configured to identify, during a training phase, which subset of parameters of the plurality of parameters most closely correlate to time waiting for said synchronization, wherein each node identifies the subset of parameters independently of other nodes.

3. The system as recited in claim 1, wherein the cluster agent is further configured to send to each node one or more performance counter thresholds and a likelihood outcome that a corresponding task will be on a critical path, and wherein each node is configured to determine whether performance counters exceed the performance counter thresholds during execution of a corresponding task.

4. The system as recited in claim 1, wherein each node is configured to:
    track one or more performance counter values for an initial period of time at a beginning of a given task;
    provide the one or more performance counter values as inputs to the model while executing the given task;
    generate, with the model, a criticality probability based on the one or more performance counter values; and
    characterize the given task as being on a critical path if the criticality probability is greater than a criticality threshold.

5. The system as recited in claim 1, wherein creating the model comprises correlating values of the subset of performance parameters with the amount of time spent waiting for synchronization.

6. The system as recited in claim 1, wherein the model is configured to generate a likelihood that a given task will be on a critical path, and wherein each node is configured to generate frequency and voltage settings based on the likelihood.

7. The system as recited in claim 1, wherein the subset of performance parameters includes at least one or more of: a translation lookaside buffer (TLB) hit rate, a percentage of time spent in kernel mode versus user mode, a number of cycles from instruction completion to retirement, and a number of cycles from instruction tagging to retirement.

8. A method comprising:
    mapping, by a cluster agent, each task of a plurality of tasks of a workload to a different node of a computing cluster comprising a plurality of nodes comprising circuitry, each of the plurality of tasks ending with a barrier configured to wait for all nodes of the cluster executing a task of the plurality of tasks to reach the barrier before starting a new task;
    creating, by each node of the plurality of nodes, a run-time prediction model independently of models created by other nodes of the plurality of nodes while performing a given task, wherein the model provides a prediction of an amount of time to complete the given task based on an amount of time waiting for synchronization of the given task and run-time values of one or more of a plurality of performance parameters of a node;
    identifying, by each node of the plurality of nodes using the model, a subset of performance parameters of the plurality of performance parameters which are predicted to correlate to an amount of time waiting for synchronization of the given task;

while the cluster has not reached a synchronization point:
tracking, by each node of the plurality of nodes, the subset of performance parameters during an initial period of time while performing a current task of the workload;
generating, independently of other nodes, a prediction while performing the current task of how long the node will take to complete the current task, wherein the prediction is generated by the model using the subset of performance parameters;
increasing an amount of power allocated to the node subsequent to the initial period of time responsive to predicting, during performance of the current task, that the node will take longer than a programmable threshold amount of time to complete the current task;
decreasing, during run-time, the amount of power allocated to the node subsequent to the initial period of time responsive to predicting, during performance of the current task, that the node will take less than the programmable threshold amount of time to complete the current task; and
determining if the cluster has reached the synchronization point.

9. The method as recited in claim 8, wherein the method further comprises each node identifying, during a training phase, which subset of parameters of the plurality of parameters most closely correlate to time waiting for said synchronization, wherein each node identifies the subset of parameters independently of other nodes.

10. The method as recited in claim 8, further comprising:
sending, by the cluster agent to each node, one or more performance counter thresholds and a likelihood outcome that a corresponding task will be on the critical path; and
determining, by each node, whether one or more performance counters exceed the one or more performance counter thresholds during execution of a corresponding task.

11. The method as recited in claim 8, further comprising:
tracking one or more performance counter values for an initial period of time at a beginning of a given task;
providing the one or more performance counter values as inputs to the model while executing the given task;
generating, with the model, a criticality probability based on the one or more performance counter values; and
characterizing the given task as being on a critical path if the criticality probability is greater than a criticality threshold.

12. The method as recited in claim 8, wherein creating the model comprises correlating values of the subset of performance parameters with the amount of time spent waiting for synchronization.

13. The method as recited in claim 8, further comprising generating a likelihood that a given task will be on a critical path and generating frequency and voltage settings based on the likelihood.

14. The method as recited in claim 8, wherein the subset of performance parameters includes at least one or more of: a translation lookaside buffer (TLB) hit rate, a percentage of time spent in kernel mode versus user mode, a number of cycles from instruction completion to retirement, and a number of cycles from instruction tagging to retirement.

15. A non-transitory computer readable storage medium comprising program instructions, wherein the program instructions are executable to:

map, by a cluster agent, each task of a plurality of tasks of a workload to a different node of computing cluster comprising a plurality of nodes comprising circuitry, each of the plurality of tasks ending with a barrier configured to wait for all nodes of the cluster executing a task of the plurality of tasks to reach the barrier before starting a new task;
create, by each node of the plurality of nodes, a run-time prediction model independently of models created by other nodes of the plurality of nodes while performing a given task, wherein the model provides a prediction of an amount of time to complete the given task based on an amount of time waiting for synchronization of the given task and run-time values of one or more of a plurality of performance parameters of a node;
identify, by each node of the plurality of nodes using the model, a subset of performance parameters of the plurality of performance parameters which are predicted to correlate to an amount of time waiting for synchronization of the given task;
while the cluster has not reached a synchronization point:
track, by each node of the plurality of nodes, the subset of performance parameters during an initial period of time while performing a current task of the workload;
generate, independently of other nodes, a prediction while performing the current task of how long the node will take to complete the current task, wherein the prediction is generated by the model using the subset of performance parameters;
increase an amount of power allocated to the node subsequent to the initial period of time responsive to predicting, during performance of the current task, that the node will take longer than a programmable threshold amount of time to complete the current task;
decrease, during run-time, the amount of power allocated to the node subsequent to the initial period of time responsive to predicting, during performance of the current task, that the node will take less than the programmable threshold amount of time to complete the current task; and
determine if the cluster has reached the synchronization point.

16. The non-transitory computer readable storage medium as recited in claim 15, wherein the initial period of time is less than a total amount of time utilized by the node for performing the task, and the program instructions are further executable to, for each node identify, during a training phase, which subset of parameters of the plurality of parameters most closely correlate to time waiting for said synchronization, wherein each node identifies the subset of parameters independently of other nodes.

17. The non-transitory computer readable storage medium as recited in claim 15, wherein the program instructions are further executable to:
send, by the cluster agent to each node, one or more performance counter thresholds and a likelihood outcome that a corresponding task will be on the critical path; and
determine, by each node, whether one or more performance counters exceed the one or more performance counter thresholds during execution of a corresponding task.

18. The non-transitory computer readable storage medium as recited in claim 15, wherein the program instructions are further executable to:

track one or more performance counter values for an initial period of time at a beginning of a given task;
provide the one or more performance counter values as inputs to the model while executing the given task;
generate, with the model, a criticality probability based on the one or more performance counter values; and
characterize the given task as being on a critical path if the criticality probability is greater than a criticality threshold.

19. The non-transitory computer readable storage medium as recited in claim 15, wherein creating the model comprises correlating values of the subset of performance parameters with the amount of time spent waiting for synchronization.

20. The non-transitory computer readable storage medium as recited in claim 15, wherein the program instructions are further executable to generate a likelihood that a given task will be on a critical path and generate frequency and voltage settings based on the likelihood.

* * * * *